United States Patent
Lev et al.

(10) Patent No.: US 7,508,383 B2
(45) Date of Patent: Mar. 24, 2009

(54) PEN/STYLUS APPARATUS AND METHOD

(75) Inventors: Jeffrey A. Lev, Cypress, TX (US); Pablo J. Salazar, Spring, TX (US); Philip Ming-Chuan Kao, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 834 days.

(21) Appl. No.: 11/022,113

(22) Filed: Dec. 22, 2004

(65) Prior Publication Data

US 2006/0132468 A1    Jun. 22, 2006

(51) Int. Cl.
*G09G 5/00* (2006.01)
(52) U.S. Cl. .................. 345/179; 345/184; 178/19.01; 178/19.02; 178/19.03; 178/19.04
(58) Field of Classification Search .............. 345/179, 345/184; 178/19.01–19.04
See application file for complete search history.

(56) References Cited

U.S. PATENT DOCUMENTS

| | | | |
|---|---|---|---|
| 5,180,891 A | 1/1993 | Trumbo | |
| 5,434,373 A | 7/1995 | Komaki | |
| 5,756,941 A | 5/1998 | Snell | |
| 6,129,430 A | 10/2000 | Wu | |
| 6,392,639 B1 * | 5/2002 | Lee et al. | 345/179 |
| 6,664,953 B2 * | 12/2003 | Quek | 345/179 |
| 7,023,430 B2 * | 4/2006 | Liu et al. | 345/179 |
| 7,319,460 B2 * | 1/2008 | Lee | 345/179 |

* cited by examiner

*Primary Examiner*—Richard Hjerpe
*Assistant Examiner*—Leonid Shapiro

(57) ABSTRACT

Embodiments of a pen/stylus apparatus are disclosed. In one embodiment, among others, a pen/stylus apparatus comprises a chamber configured to receive a pen, a holding element having a shaft, the holding element configured to retain the pen in a partially-ejected position, a button having a retainer, the retainer configured to retain the shaft when the pen is completely-inserted in the chamber, and a biasing element adjacent to the holding element, the biasing element configured to eject the holding element to a position corresponding to the partially-ejected position of the pen when the retainer is released from the shaft.

14 Claims, 6 Drawing Sheets

PEN/STYLUS APPARATUS AND METHOD

BACKGROUND

Portable computing devices, such as palm-top computers, hand-held computers, laptop computers, personal computer tablets, and personal digital assistants (PDAs), have become increasingly popular. Many of these portable computing devices comprise an electronic stylus or pen that can be utilized by a user to input information into the computer or to select menu options or otherwise navigate through a graphical user interface of an operating system or running software application.

Various mechanisms have been utilized to hold or otherwise mount the stylus or pen to or into the portable computing device. Most mechanisms are focused on a design that allows for manual ejection of the pen. These include pushing on one side of the pen and having the other side pop-up for the user to grab. In many cases, this can be a poor mechanism because of the need for two hands, which limits usability for customers having only one hand. Other mechanisms bury the pen in the system and require the user to grab a tab and pull the pen out manually. This can be difficult, as these pens are usually very small. Having a feature to grab can be difficult for those with large fingers or reduced dexterity. Further, in many of these manual mechanisms, the pen holding element wears down over time, which may result in the pen falling out without the user wanting it to.

SUMMARY

An embodiment of a pen/stylus apparatus comprises a chamber configured to receive a pen, a holding element having a shaft, the holding element configured to retain the pen in a partially-ejected position, a button having a retainer, the retainer configured to retain the shaft when the pen is completely-inserted in the chamber, and a biasing element adjacent to the holding element, the biasing element configured to eject the holding element to a position corresponding to the partially-ejected position of the pen when the retainer is released from the shaft.

An embodiment of a pen/stylus apparatus comprises means for housing a pen, means for retaining the pen in a partially-ejected position, means for retaining the pen in a completely-inserted position, means for releasing the pen from the completely-inserted position, and means for biasing the pen to the partially-ejected position.

An embodiment of a computer panel comprises a display screen, a panel bezel, a pen/stylus apparatus provided in the panel bezel, the pen/stylus apparatus comprising a chamber configured to receive a pen, a holding element having a shaft, the holding element configured to retain the pen in a partially-ejected position, a button accessible from the panel bezel, the button having a retainer, the retainer configured to retain the shaft when the pen is completely-inserted in the chamber, and a spring adjacent to the holding element, the spring configured to eject the holding element to a position corresponding to the partially-ejected position of the pen when the retainer is released from the shaft.

An embodiment of a method for operating a pen/stylus apparatus comprises retaining a pen in a completely-inserted position, responsive to a button depression, releasing the pen, and biasing the pen to a secure and partially-ejected position.

BRIEF DESCRIPTION OF THE DRAWINGS

The components in the drawings are not necessarily to scale, emphasis instead being placed upon clearly illustrating the principles of the disclosed apparatus and methods. Moreover, in the drawings, like reference numerals designate corresponding parts throughout the several views.

DETAILED DESCRIPTION

Disclosed herein are various embodiments of a pen/stylus apparatus and method. In particular, embodiments of a pen/stylus apparatus provide a mechanism to mount, store, and eject a pen or stylus (herein, the term "pen" will be used for describing either a pen or stylus) in a manner that provides for ease of access, among other benefits. Such embodiments also provide for a reliable engagement between the pen and the pen/stylus apparatus, providing for partial ejection of the pen and complete removal upon the user manually retrieving the pen. The pen may then be returned to the pen/stylus apparatus simply by pressing the pen into the apparatus, resulting in an automatic engagement between the pen and apparatus which secures the pen in place.

Figure 1:
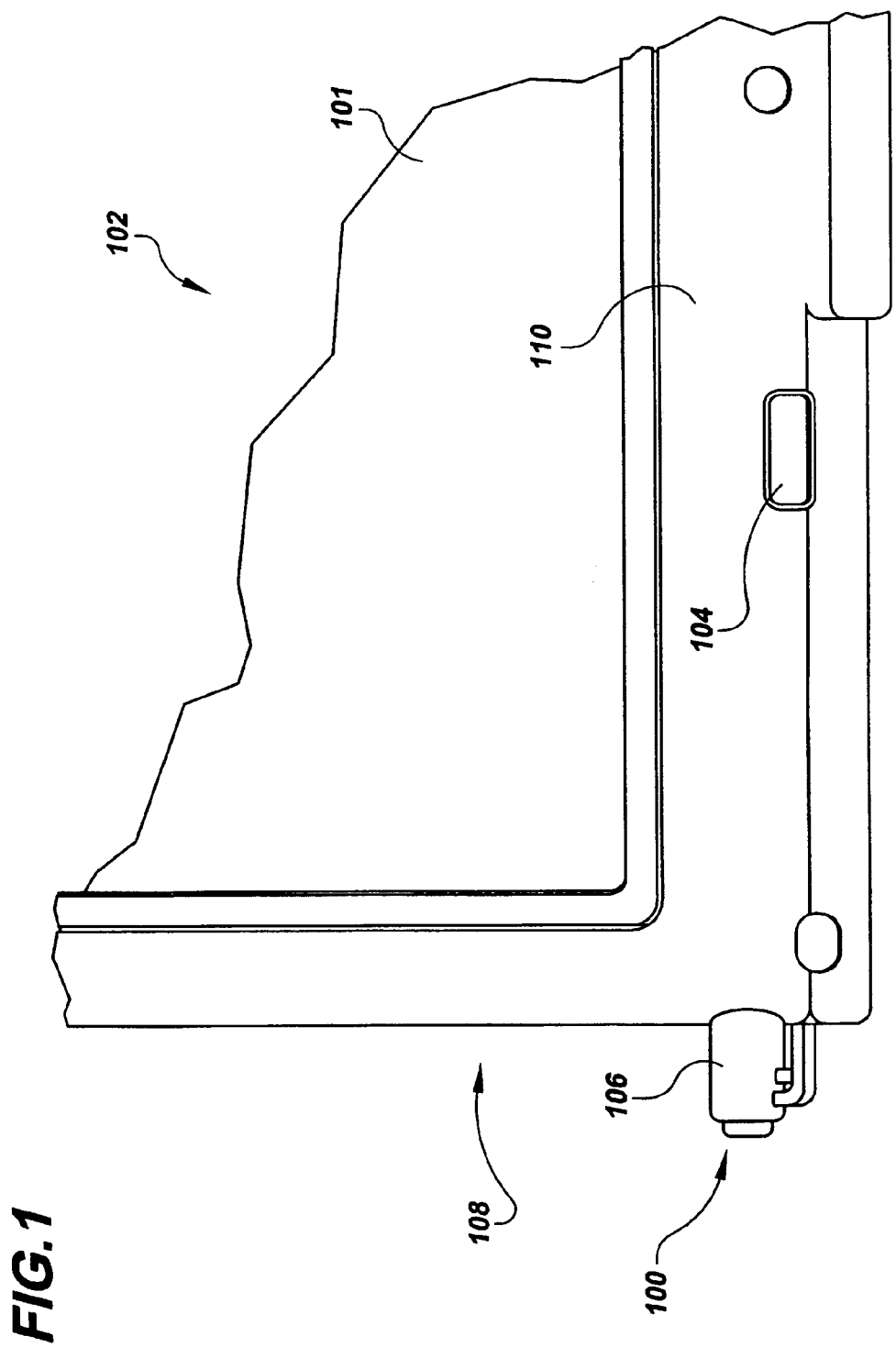
FIG. 1 is a front elevation view of a computer panel that serves as an example environment for an embodiment of a pen/stylus apparatus.

FIG. 1 is a front elevation view of a computer panel that serves as an example environment for an embodiment of a pen/stylus apparatus 100. Although described using a personal computer (PC) tablet panel, some or all of the features of the pen/stylus apparatus 100 may be implemented in other devices that secure a pen, stylus, or other writing implement or implements to or within the device. The computer panel 102 comprises an eject button 104 disposed on the panel bezel 110 adjacent a display screen 101 of the computer panel 102, and a chamber formed by the computer panel rear enclosure and the panel bezel 110. The chamber may be accessed from the side 108 of the computer panel 102. In some embodiments, the pen/stylus apparatus 100 may be disposed in the base of a computer (e.g., PC tablet base), or in other areas of the computer panel 102.

Further, the eject button 104 may be disposed in other areas as well, including on the side 108 of the computer panel 102. The chamber houses a pen 106. Prior to a user pressing the eject button 104, the pen 106 is almost completely encased in the chamber of the computer panel 106, with one end of the pen 106 flush with the side 108 of the computer panel 102 and visible when a user views the side 108 of the computer panel 102. Responsive to a user pressing the eject button 104, the pen 106 is partially dislodged from the chamber, yet secure. To remove the pen 106 completely from the chamber, the user grasps the pen 106 and pulls it from the chamber.

Figure 2:
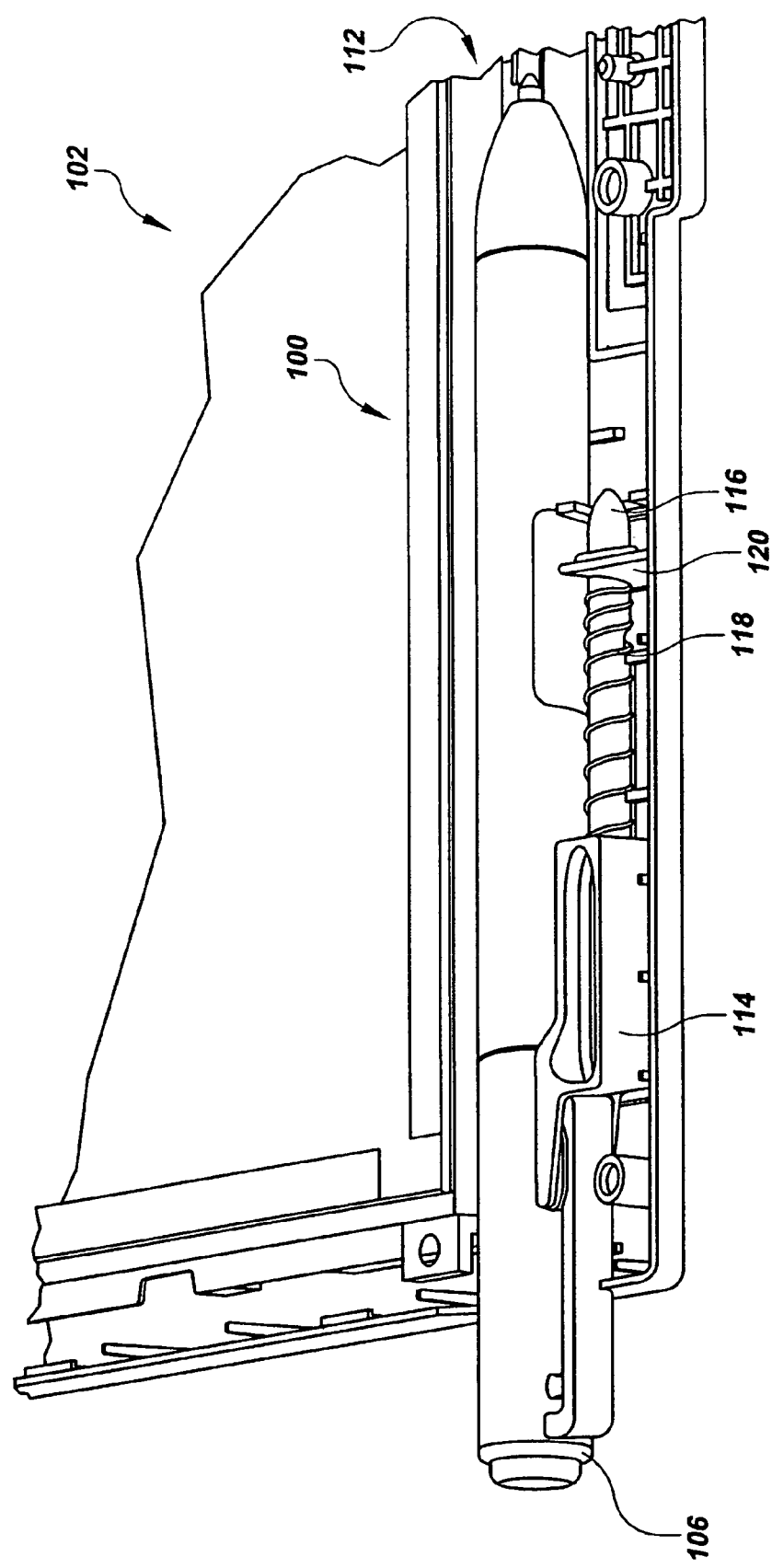
FIGS. 2-3 are cut-away views of the computer panel showing an embodiment of a pen/stylus apparatus.

FIG. 2 is a cut-away view of the computer panel 102 showing the pen/stylus apparatus 100. The pen 106 is shown in the partially-ejected position. A chamber 112 is shown, comprising the pen 106, a holding element 114, a shaft 116, a biasing element 118, and a wall 120. Standard materials may be used for the various components of the pen/stylus apparatus 100. The pen 106 may be configured with electronic circuitry to provide digitizing functionality in cooperation with a graphics user interface displayed on the display screen. For example, the holding element 114 may be comprised of plastic, and the pen 106 may be comprised of a dissimilar material, such as a nylon-based material. The chamber 112 may comprise a chamber slot to accommodate the pen 106 in a defined alignment. In other words, the pen 106 cannot be inserted into the chamber 112 unless certain features on the pen 106 align with a chamber slot in the chamber 112.

Tabs on the holding element 114 fit into a slot on the pen 106. The natural material strength of the pen 106 and the tabs on the holding element 114 maintain the engagement between the holding element 114 and the pen 106, but relent when a user pulls the pen 106, as described below. The holding element 114 is coupled to the shaft 116, and thus the combination of the shaft 116 and the holding element 114 is free to move in a plane coincident to the axis of the chamber 112. The shaft 116 is surrounded by the biasing element 118. The biasing element 118, such as a spring, compresses and relaxes between the wall 120 and the holding element 114 during pen insertion and ejection, respectively. The biasing element 118 provides a force to cause the holding element 114 and the shaft 116 to move in a manner that partially ejects the pen 106 from the chamber 112.

In operation, when the pen 106 is pushed into the chamber 112, the tabs on the holding element 114 engage with a slot on the pen 106. Continuation of insertion of the pen 106 causes the holding element 114 and the shaft 116 to simultaneously move into the chamber 112, compressing the biasing element 118 until the shaft 116 reaches a locked or secured position within the chamber 112, as described below. When the shaft 116 is released from the secured position, the biasing element 118 is displaced from the secured position, forcing the holding element 114 to move in a direction that causes the pen 106 to also move out of the chamber 112 to a partially-ejected position, stopped by the engagement of the tabs of the holding element 114 and a grip element located at one end of the slot of the pen 106.

Figure 3:
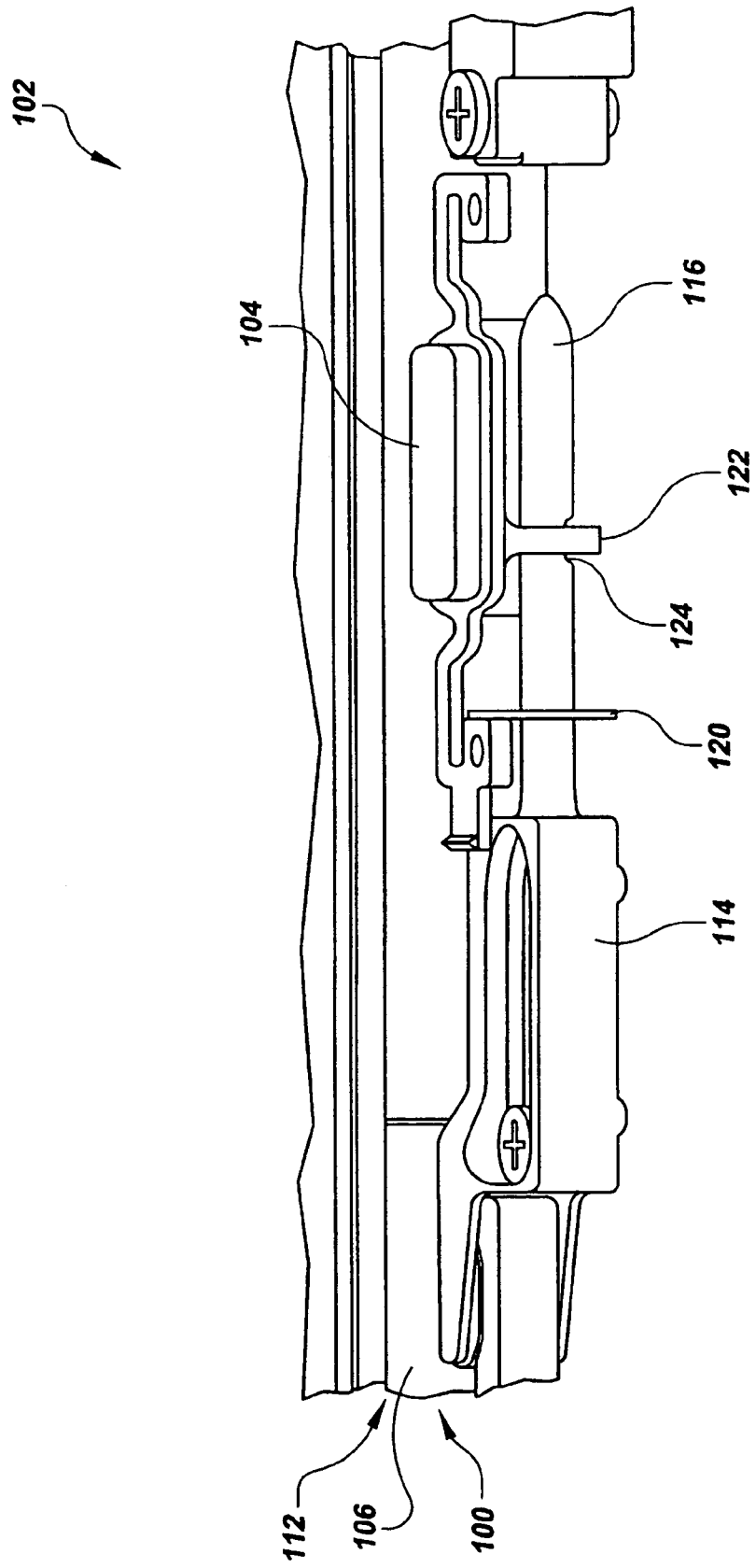

FIG. 3 is another cut-away view of the computer panel 102, showing a different perspective of the stylus/pen apparatus 100 to further illustrate the cooperation of parts. The pen/stylus apparatus 100 comprises the holding element 114, shaft 116, spring (not shown in this view to reveal other features, but disposed between the wall 120 and the holding element 114), wall 120, and eject button 104. The eject button 104 comprises a retainer 122. The shaft 116 comprises a notch 124 that engages the retainer 122 when the pen 106 is fully inserted into the chamber 112 of the computer panel 102, and disengages when the eject button 104 is depressed. A user may recognize full insertion of the pen 106 to a secure position by a clicking sound manifested from the notch 124 engaging with the retainer 122.

Figure 4:
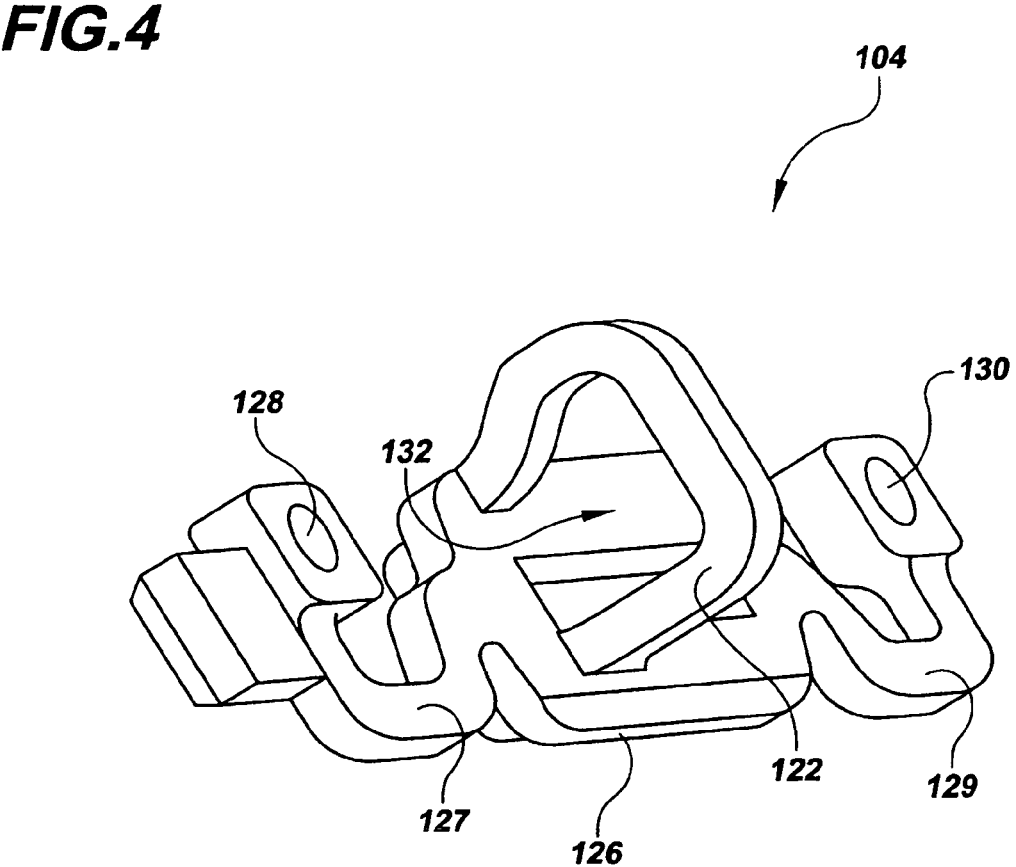
FIG. 4 is a perspective view of the backside of an embodiment of an eject button.

FIG. 4 shows the backside of an embodiment of the eject button 104, providing further detail of the retainer 122 and other features. The retainer 122 may be circular, rectangular, or of other geometric configurations, and molded to a base structure 126 comprising openings 128 and 130. Various coupling elements may be disposed through the openings 128 and 130 to secure the base structure 126 to the chamber 112. For example, openings 128 and 130 may fit over pins disposed on the backside of the panel bezel 110 of the computer panel 102 (FIG. 1). The pins can be melted to hold the base structure 126 in place, a technique referred to as heat staking. Other securing techniques may make use of screws, rivets, or adhesives. When the locations of the base structure 126 corresponding to opening 128 and 130 are secured to the backside of the panel bezel 110 of the computer panel 102, arms 127 and 129 connecting the openings 128 and 130, respectively to the base structure 126 can flex when the button 104 (FIG. 3) is depressed. The memory of the material (e.g., plastic) of the arms 127 and 129 can be utilized as a spring that returns the arms 127 and 129 to their initial (pre-depressed) position when the button 104 is released. The shaft 116 (FIG. 3) slides through shaft opening 132 when the retainer 122 is not engaged to the notch 124 (FIG. 3) of the shaft 116.

With simultaneous reference to FIG. 3, when the pen 106 is fully inserted into the chamber 112, the shaft 116 extends through the shaft opening 132 formed by the retainer 122 of the eject button 104. In a secured position, the shaft 116 is engaged to the retainer 122 by the walls of the notch 124, which prevent movement of the shaft 116 along the axis of the chamber 112. Upon a user pressing the eject button 104, the retainer 122 clears the walls of the notch 124, enabling the shaft 116 to move under the force of the biasing element 118. In an alternative embodiment, a notch or like functioning feature may be used in place of the retainer 122, and a retainer or latch mechanism can be incorporated as part of the shaft to accomplish similar functionality, essentially reversing the application.

Figure 5:
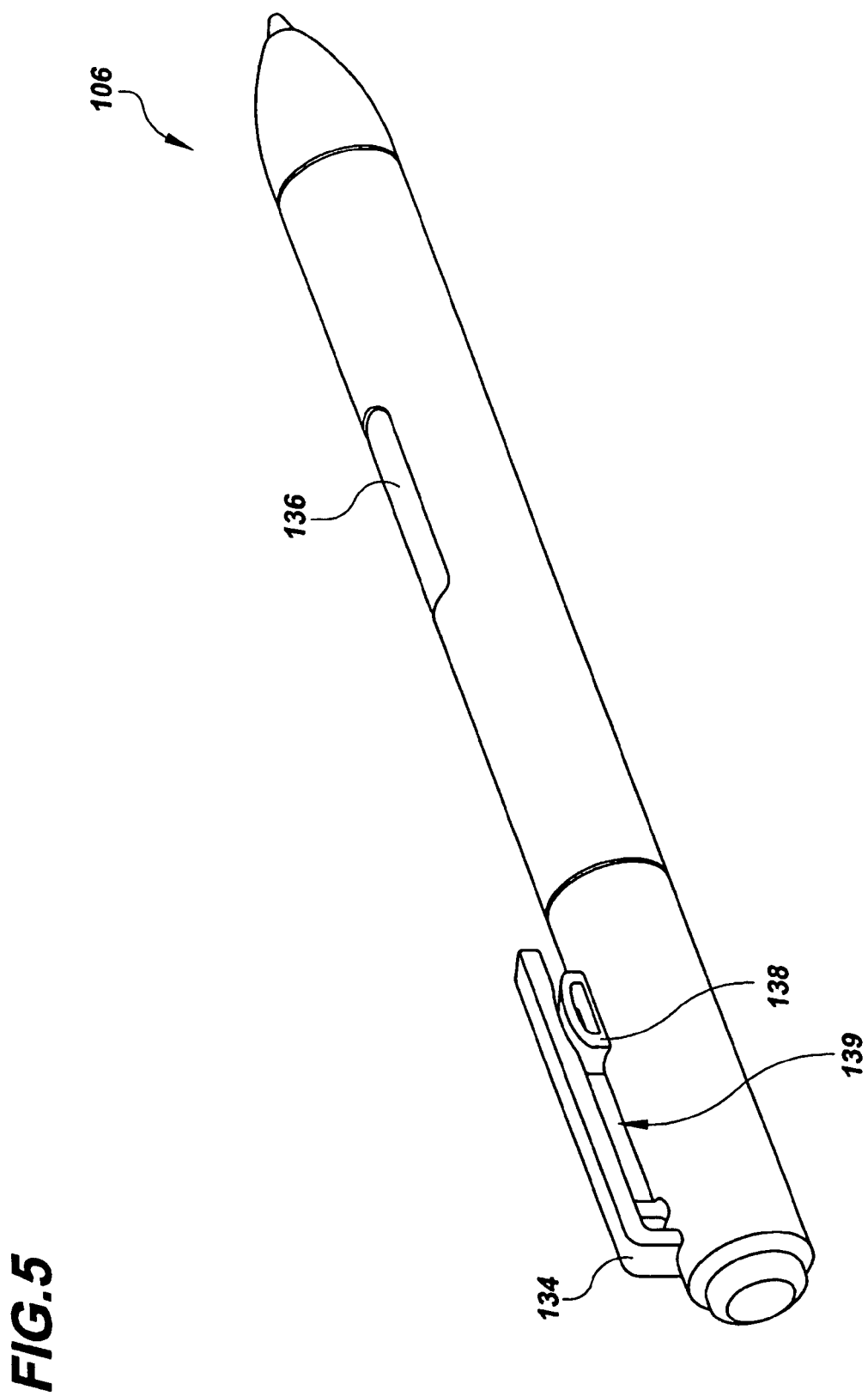
FIG. 5 is a perspective view of an embodiment of a pen.

FIG. 5 is a perspective view of an embodiment of the pen 106. The pen 106 comprises a clip 134, a mouse button 136 (for enabling interaction with a graphics user interface), and a grip element 138 disposed between the clip 134 and the pen body, forming a slot 139 between the clip 134 and the pen 106, the slot 139 receiving tabs on the holding element 114 in an interference fit. When the pen 106 is to be inserted into the chamber 112 (FIG. 2), the clip 134 is to be aligned with the chamber slot of the chamber 112. This ensures that the grip element 138 aligns with the features of the holding element 114 (FIG. 2) to enable an interference or compression fit engagement that secures the pen 106 to the holding element 114 at the partially-ejected position of the pen 106. The grip element 138 may be embodied in any geometric shape that enables the tabs of the holding element 114 to engage the pen 106 in the partially-ejected position.

Figure 6:
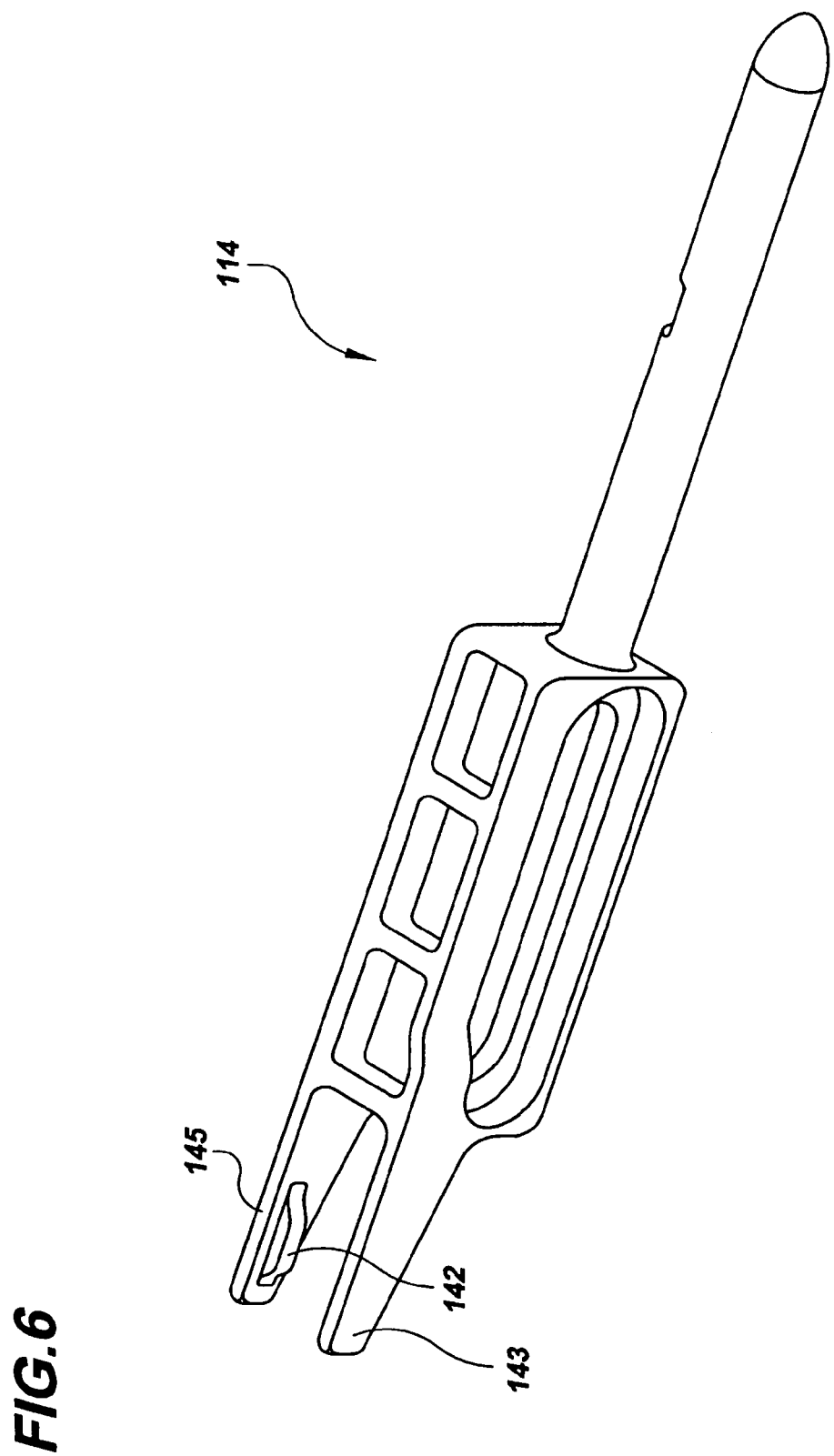
FIG. 6 is a perspective view of an embodiment of a holding element that engages a pen or stylus.

FIG. 6 provides a perspective view of the holding element 114 on the surface where the pen 106 (FIG. 2) abuts against the holding element 114. The holding element 114 comprises two arms 143 and 145 each having tabs 142 (one shown, one obscured from view) that engages with the grip element 138 (FIG. 5) on the pen 106. In other words, during insertion and removal of the pen 106, the tabs 142 fit in between the slot 139 (FIG. 5) of the pen 106. When the pen 106 is in a partially-ejected position, the tabs 142 engage with the grip element 138 on the pen 106, requiring additional force (e.g., by manually grasping and pulling the pen 106) to overcome the interference fit between the grip element 138 and the tabs 142. Movement between the tabs 142 and the slot 139 and grip element 138 is made possible by the bending and snap-back action (e.g., material memory) of the arms 143.

In alternative embodiments, one tab 142 or one arm 143 having one tab 142 may be used to perform like functionality, the opposing arm 145 (and/or corresponding tab) replaced with a sidewall of the chamber 112 (FIG. 2).

What is claimed is:

1. A pen/stylus apparatus, provided in the panel bezel, comprising:
    a chamber configured to receive a pen;
    a holding element having a shaft, the holding element configured to retain the pen in a partially-ejected position;
    a button having a retainer, the retainer configured to retain the shaft when the pen is completely-inserted in the chamber; and
    a biasing element adjacent to the holding element, the biasing element configured to eject the holding element to a position corresponding to the partially-ejected position of the pen when the retainer is released from the shaft.

2. The pen/stylus apparatus of claim 1, wherein the pen comprises a clip and a grip element, the clip forming a slot between the pen and the clip.

3. The pen/stylus apparatus of claim 2, wherein the holding element comprises two arms, each having a tab to engage the pen in the slot when the pen is disposed between the partially-ejected position and a completely-inserted position.

4. The pen/stylus apparatus of claim 2, wherein the holding element comprises two arms, each having a tab to engage the pen at the grip element when the pen is in the partially-ejected position.

5. The pen/stylus apparatus of claim 1, wherein the shaft comprises a notch having walls that, when engaged to the retainer, restrains movement of the shaft.

6. The pen/stylus apparatus of claim 1, wherein the biasing element is a spring.

7. The pen/stylus apparatus of claim 1, wherein the retainer comprises at least one of a rectangular shape and a circular shape.

8. The pen/stylus apparatus of claim 1, wherein the pen comprises electronic circuitry.

9. A pen/stylus apparatus, provided in the panel bezel, comprising:
   means for housing a pen;
   means for retaining the pen in a partially-ejected position, wherein the means for retaining the pen in the partially-ejected position comprises a holding element having at least one arm, the arm having a tab configured to engage a grid element on the pen;
   means for retaining the pen in a completely-inserted position;
   means for releasing the pen from the completely-inserted position; and
   means for biasing the pen to the partially-ejected position.

10. The pen/stylus apparatus of claim 9, wherein the means for housing comprises a chamber configured to receive a pen.

11. The pen/stylus apparatus of claim 9, wherein the means for retaining the pen in a completely-inserted position comprises a button having a retainer and a shaft having a notch.

12. The pen/stylus apparatus of claim 9, wherein the means for releasing the pen from the completely-inserted position comprises a button having a retainer and a shaft having a notch.

13. The pen/stylus apparatus of claim 9, wherein the means for biasing the pen to the partially-ejected position comprises a holding element, a wall element coupled to a button base structure, and a spring disposed between the holding element and the wall element.

14. A computer panel, comprising:
   a display screen;
   a panel bezel; and
   a pen/stylus apparatus provided in the panel bezel, the pen/stylus apparatus comprising:
      a chamber configured to receive a pen;
      a holding element having a shaft, the holding element configured to retain the pen in a partially-ejected position;
      a button accessible from the panel bezel, the button having a retainer, the retainer configured to retain the shaft when the pen is completely-inserted in the chamber; and
      a spring adjacent to the holding element, the spring configured to eject the holding element to a position corresponding to the partially-ejected position of the pen when the retainer is released from the shaft.

* * * * *

UNITED STATES PATENT AND TRADEMARK OFFICE
CERTIFICATE OF CORRECTION

| | |
|---|---|
| PATENT NO. | : 7,508,383 B2 |
| APPLICATION NO. | : 11/022113 |
| DATED | : March 24, 2009 |
| INVENTOR(S) | : Jeffrey A. Lev et al. |

It is certified that error appears in the above-identified patent and that said Letters Patent is hereby corrected as shown below:

In column 5, line 30, in Claim 9, delete "grid" and insert -- grip --, therefor.

Signed and Sealed this

Eleventh Day of August, 2009

David J. Kappos
*Director of the United States Patent and Trademark Office*